March 8, 1966  H. E. FROMME  3,238,861

AIR VALVE

Filed March 24, 1964

INVENTOR.
Harry E. Fromme
BY George Galentein
ATTORNEY

United States Patent Office 3,238,861
Patented Mar. 8, 1966

---

3,238,861
AIR VALVE
Harry E. Fromme, Dallas, Tex., assignor to Bell Aerospace Corporation, a corporation of New York
Filed Mar. 24, 1964, Ser. No. 354,292
5 Claims. (Cl. 98—40)

This invention relates to air valves, particularly to improvements in air valves of the type used to control the direction and amount of air flow to prescribed areas.

Numerous air valves of this type have been designed and manufactured for the purpose of directing and controlling the amount of air flow, as for example, those in general use today in automobile air conditioning systems. The present invention is directed at improvements in this type of valve and it combines design and material in a unique manner to accomplish the hereinafter noted objects.

It is an object of this invention to provide an air flow control device of a minimum number of parts that is easy to assemble and disassemble and efficient in its operation.

It is an object of this invention to provide an air valve with low maintenance and servicing requirements.

It is an object of this invention to provide an air valve with easily adjustable and variable friction control.

Figure 1:
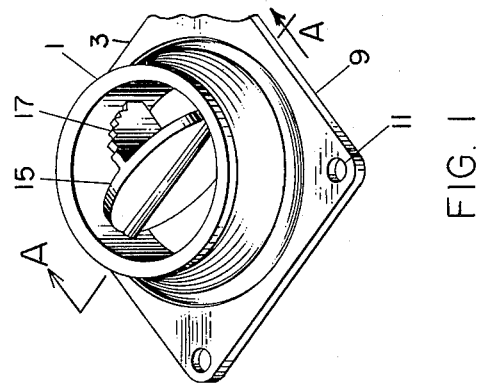
FIG. 1 is a perspective of a valve constructed in accordance with the present invention.
Figure 2:
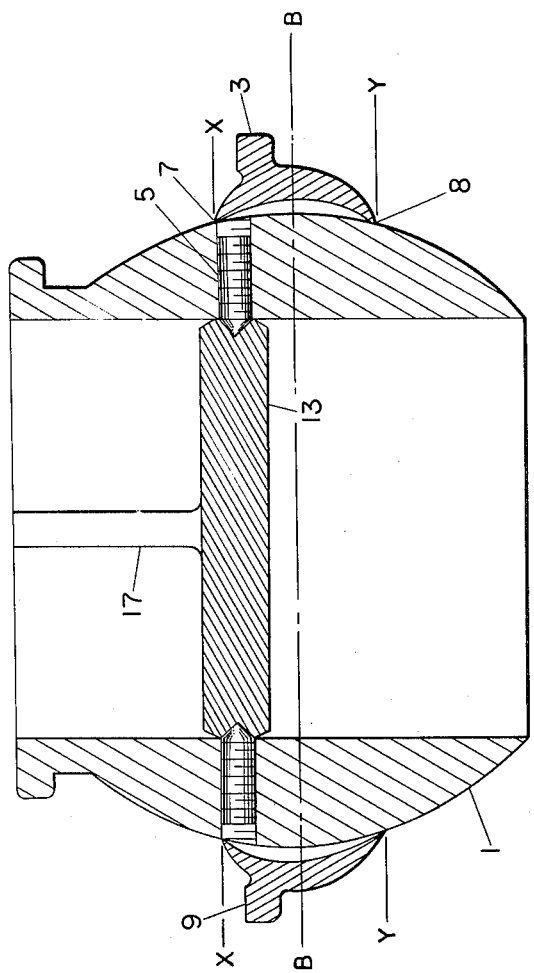
FIG. 2 is a cross section through section A—A of FIG. 1.

Referring to FIGS. 1 and 2, ball 1 has its external surface in the form of a sphere with an interior hollow section of cylindrical shape to permit the entrance and exit of air which will flow in the direction noted. Socket 3 circumscribes ball 1 with lips 7 and 8 contacting ball 1 in such relationship that the ball can be universally positioned with reference thereto which, of course, will determine the direction of air flow through the valve. A mounting flange 9 is an integral part of the socket 3 and is used to attach the valve through holes 11. Butterfly 13 has a disc 15 which is pivoted interior of and to ball 1 on axis A—A by means of pivot pins 5 which screw into and extend through the walls of ball 1. Handle 17 attaches perpendicularly from disc 15 and is used to rotate disc 15 around axis A—A, thus controlling the amount of air flow through the valve. It should be noted that the butterfly 13 in FIG. 1 is illustrated in a full open position, whereas for reasons of clarity, it is illustrated in FIG. 2 rotated to a full closed position.

The socket 3 has elastic properties and is assembled in position as indicated by forcing lip 8 over ball 1. The socket will "settle" around the ball with lip seals 7 and 8 approximately equidistant from line B—B which represents a plane through the center of the sphere defined by the exterior surface of ball 1. Proper interference fits between lips 7 and 8 and the ball 1 in planes X—X and Y—Y, respectively, will maintain the socket 3 in this relative position and will prevent entrance of dust, dirt and other matter which might tend to bind the ball in the socket, but will permit movement between socket 3 and ball 1.

Rotation of butterfly 13 around axis A—A will control the air flow as required, and it should be noted that the axis A—A may be positioned as desired by rotation of the ball within the socket, thus permitting universal directional air flow control in any amount required.

Restraint or friction on the butterfly to maintain its position relative to the ball is easily attained by adjusting pins 5 through their threaded connections to ball 1. Such adjustment can be made without removing ball 1 from socket 3.

In addition, the ball can be removed from the socket without removing the socket from its mounting by pressing the ball through the socket. Similarly the two parts can be reassembled.

The assembly thus defined is composed of only three basic parts, the ball, socket and butterfly, all of which may easily be assembled or disassembled while providing, simply and economically, the desirable characteristics hereinabove noted.

Although other elastic materials may be used for the socket, acetal resin plastic has been found to be advantageous as such material is of low cost, has excellent molding characteristics, is available in a wide range of colors, and is dimensionally stable over a large temperature range. For these reasons it has also been found advantageous to use the same material for the ball and the butterfly. In addition use of the same material for all three parts contributes to a low cost.

Although only one form of the invention has been specifically illustrated and described in detail hereinabove, it will be understood that various changes may be made without departing from the spirit of the invention or the scope of the accompanying claims.

I claim:

1. A body having an aperture and an outer wall surface shaped as a spherical segment
   an elastic one piece socket
   said socket comprising a ring circumscribing said body and having two lips contacting said spherical segment on opposite sides of a plane through the radial center of said spherical segment
   pivotal means extending from said body into said aperture and
   a damper plate attached to said pivotal means and positioned within said aperture
   whereby said body may be rotated within said socket and said damper plate may be pivoted within said aperture to provide quantitative and directional control of air flow.

2. Apparatus as in claim 1 whereby said socket may be engaged and disengaged from said body by pushing said body against one of said lips and causing the lip to elastically expand.

3. Apparatus as in claim 2, said pivotal means comprising a pin member adjustable with respect to said body whereby the frictional force between said pin member and said damper plate can be varied.

4. An air valve comprising
   a body having an opening extending therethrough and an outer wall surface shaped as a spherical segment
   a one-piece elastic socket shaped like a ring and having an interior surface forming a radius lesser than that of said outer wall surface of said segment and an exterior surface forming a radius lesser than that of said interior surface
   said interior and exterior surfaces intersecting to form two lips disposed adjacent said spherical segment on opposing sides of a plane extending through the center of said spherical segment pivot means extending across the opening in said body a damper operatively attached to said pivotal means whereby said body and said damper can be rotated with respect to said socket and said body respectively so as to provide for quantitative and directional control of air flow through said valve.

5. Apparatus as in claim 4, said pivotal means comprising a pin member extending through said body into said aperture whereby said pin member can be positionally adjusted with respect to said damper.

References Cited by the Examiner
UNITED STATES PATENTS

| 2,301,985 | 11/1942 | Vagliani | 98—40 |
| 2,596,869 | 5/1952 | Ross | 98—40 |
| 2,814,978 | 12/1957 | Sallou | 98—40 |

ALDEN D. STEWART, *Primary Examiner.*

JOHN F. O'CONNOR, *Examiner.*